United States Patent Office
3,540,106
Patented Nov. 17, 1970

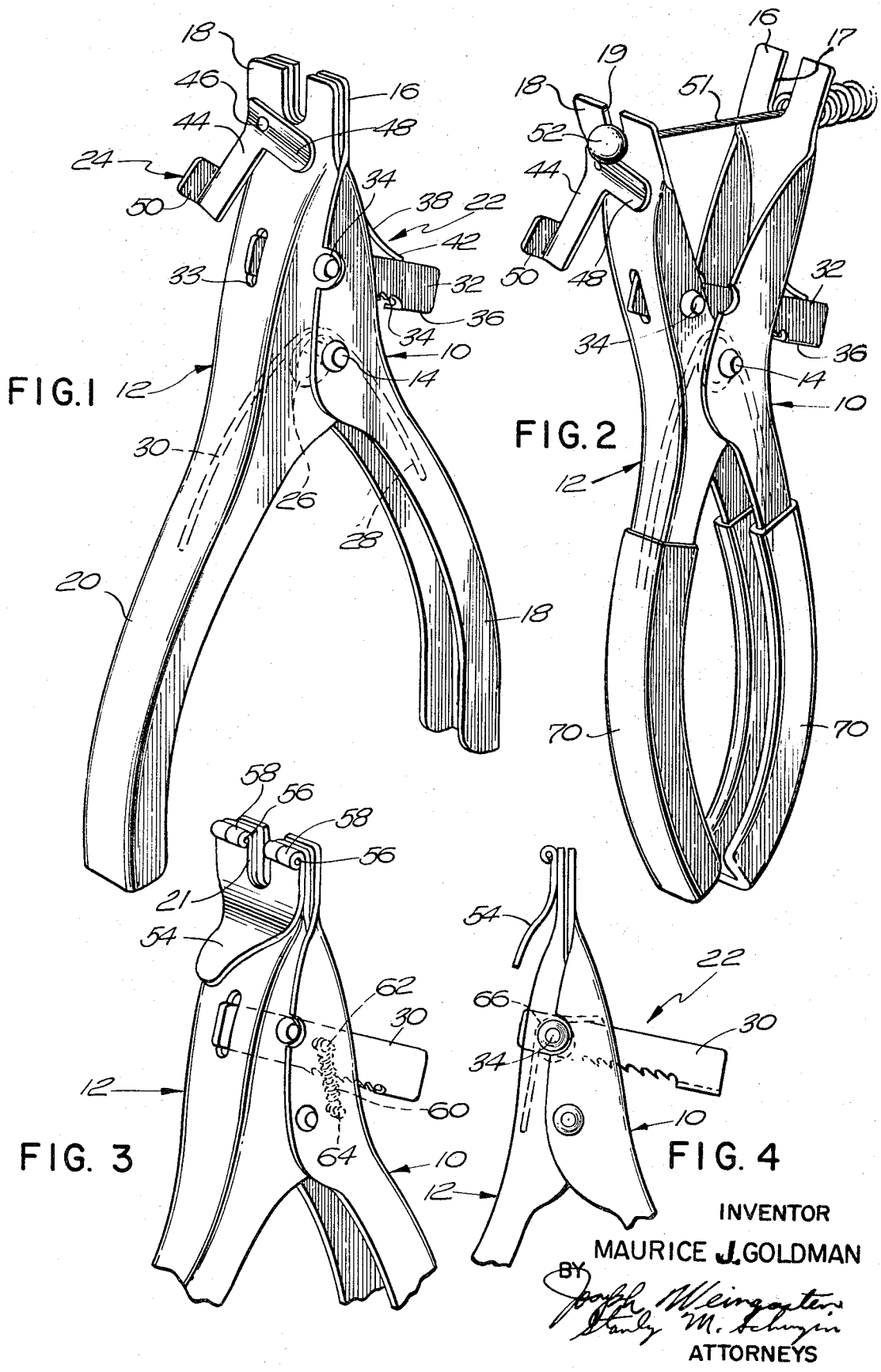

3,540,106
BRAKE CABLE RELEASE TOOL
Maurice J. Goldman, 382 Massapoag Ave.,
Sharon, Mass. 02067
Filed July 10, 1968, Ser. No. 743,659
Int. Cl. B23p 19/04; B25b 7/14
U.S. Cl. 29—268                                6 Claims

ABSTRACT OF THE DISCLOSURE

A hand tool for use in removing the brake cable assembly of an automotive vehicle. A pair of pivotally movable jaws are inserted between the brake cable spring and the cable mounting and the jaws are moved apart causing the brake cable spring to be forced away from the cable and member, The cable assembly can then be removed from its mounting plate, and a release mechanism associated with one of the jaws is provided to remove the cable assembly from the tool.

FIELD OF THE INVENTION

This invention relates to manually operable tools and more particularly to tools for the removal of automotive brake cable assemblies.

BACKGROUND OF THE INVENTION

The emergency brake cable assembly of an automotive vehicle includes a steel cable attached at on end to the braking mechanism. Usually, the brake cable is formed with a steel ball, rod, or other securing member on the end thereof and has a coil spring provided around the cable, the cable being coupled to an arm of the brake mechanism by means of the spring and ball. By reason of the spring force and the configuration of the brake mechanism arm, it is an extremely difficult and time consuming task to remove, by conventional means, such a cable assembly from the brake mechanism, as for example when replacing the brake shoes. Conventionally, such brake cable assemblies are removed by brute force, usually with the aid of a screwdriver and pliers employed to pry the cable assembly spring off its mounting plate. Such crude methods of removal have not been found satisfactory and can often result in injury to the mechanic, in addition to damage to the cable assembly. It would be advantageous to have, and it is an object of this invention to provide a simple hand tool for the easy removal of a brake cable assembly from the brake mechanism.

SUMMARY OF THE INVENTION

In accordance with the present invention, a manually operable tool is provided to slacken the brake cable and to allow its easy removal from the brake mechanism. A pair of pivotally movable jaws operable by pivotally movable handles are configured to fit between the brake cable end member and the brake cable spring. Opening of the jaws causes the brake cable spring to be forced away from the cable end member. The cable assembly can then be easily removed from its mounting member by means of the novel tool, and the cable assembly can then be removed from the jaws of the tool by a pivotal release mechanism connected to one of the movable jaws.

Considering the invention in greater detail, a ratchet mechanism is provided to maintain the jaws in predetermined open positions. A release mechanism is pivotally attached to an end of one of the jaws and is operative to efficiently remove the cable assembly from the tool after the cable assembly has been removed from its mounting in the vehicle.

DESCRIPTION OF THE DRAWINGS

The invention will be more fully understood from the following detailed description, taken in conjunction with the accompanying drawings, in which:

FIG. 1 is a pictorial view of a brake cable release tool according to the invention, in its closed position;

FIG. 2 is a pictorial view of the invention in its fully opened position;

FIG. 3 is an alternative embodiment of the invention; and

FIG. 4 is a further embodiment of a brake cable release tool according to the invention.

DETAILED DESCRIPTION OF THE INVENTION

The novel hand tool is illustrated in its closed position in FIG. 1 and includes a pair of members 10 and 12 pivotally attached to each other by means of a pin 14 passing through aligned openings provided in the bulbous central portion of the members, a pair of jaws 16 and 18 formed respectively on one end of members 10 and 12, and a pair of handles 18 and 20 formed on the opposite ends of members 10 and 12, respectively. A ratchet mechanism 22 is provided in the central portion of members 10 and 12 for maintaining jaws 16 and 18 in selected spaced-apart relationship during operation of the tool. A release mechanism 24 is pivotally attached to jaw 18 and is operative to remove the brake cable spring held by jaws 16 and 18 after removal of the cable assembly from its mounting plate in a vehicle.

The tool is constructed of metal and can be fabricated by a variety of well known methods such as stamping, forging or casting, or a combination of these methods. The illustrated tool has been fabricated of sheet metal and formed to the desired configuration by well known stamping operations.

Jaws 16 and 18 are of generally rectangular shape and are sufficiently thin to permit easy insertion into the coil spring of a brake cable assembly. A U-shaped slot 17 and 19 is provided in each jaw, respectively, with the slots terminating at the distal ends thereof. The slots are operative to permit one of the jaws to engage the end of the brake cable spring adjacent the mounting plate, as will be further explained hereinbelow. The jaws are normally closed as seen in FIG. 1 and are separated by manual operation of handles 18 and 20. A coil spring 26 is disposed within the central portion of members 10 and 12 around pin 14, this spring having elongated ends 28 and 30 extending into and in contact with respective handles 18 and 20. The jaws 16 and 18 are opened against the urging of spring 26, which is operative to return the jaws to their closed position when an operating force is removed from handles 18 and 20 and ratchet mechanism 22 is disengaged.

The jaws are maintained in predetermined spaced-apart relationship by means of ratchet mechanism 22 which includes a rectangular member 32 having ratchet teeth 34 formed on an edge thereof, and an operating pad 36 disposed orthogonally from member 32. Member 32 passes through a rectangular slot (not shown) provided in the central portion of member 10, and is pivotally attached to member 12 at a position above pivot 14 by a pin 34. In the illustrated embodiment, one end of member 32 extends through a slot 33 provided in member 12, although this is not, of course, necessary. A leaf spring 38 is attached at one end to member 18 near jaw 16 by a suitable fastener and has its other end 42 in forceable contact with the edge of member 32 opposite to ratchet teeth 34. Spring 38 is thus effective to cause engagement of ratchet teeth 34 with the confronting edge of the slot through which member 32 passes, thereby maintaining jaws 16 and 18 in a desired open position. Member 32 is of a length such that jaws 16 and 18 can be maintained in an intermediate open position and a fully opened position during operation of the tool.

The release mechanism 24 comprises a generally L-shaped member including arms 44 and 48 pivotally attached by pin 46 at the junction region of the orthogonally extending arms to jaw 18 in a position such that in one position arm 48 lies adjacent the bottom of slot 19, and in another position arm 48 pivots across slot 19 to the distal end of jaw 18. An operating pad 50 upstanding from arm 44 permits efficient pivotal movement thereof. Arm 48 is curved slightly so that arm 44 and pad 50 are angularly disposed from the tool for ease of operation of the release mechanism.

To employ the novel hand tool in the removal of a brake cable assembly, jaws 16 and 18, in their closed position, are inserted between the brake cable spring and the cable end member, with the U-shaped slots of jaws 16 and 18 inserted around the cable, as illustrated in FIG. 2. Handles 18 and 20 are then drawn together to open jaws 16 and 18, causing the brake cable spring to be forced away from the cable end member. The position of the tool in this fully opened position is seen in FIG. 2 and it is evident that ratchet mechanism 22 maintains the jaws in their open position. The mounting ball 52 and the brake cable 51 are removed from the tool by means of release mechanism 24. More particularly, the member 44 is rotated by the application of digital force, typically by use of the forefinger of the operator, to pad 50, thereby to urge the ball 52 and cable 51 passing through the U-shaped channel of jaw 18 off of the jaw. In this manner, the tool is easily released from the brake cable after the cable assembly has been removed from its mounting.

An alternative embodiment of the invention is illustrated in FIG. 3 wherein the release mechanism comprises a generally Y-shaped lever 54 pivotally attached to the end of jaw 18 by means of pins 56 passing through journal portions 58 formed on the bifurcated extremities of lever 54 and the distal end of jaw 18. This lever has a U-shaped slot 21 substantially in alignment with slot 19 in jaw 18. In operation, the end of the brake cable adjacent the mounting ball passes through the slot of lever 54, and by pivoting the lever toward the jaws 16 and 18, the ball and the associated brake cable can be easily removed from the tool after the cable assembly has been disconnected.

The embodiment of FIG. 3 also differs from that of FIG. 1 in that a coil spring 60 is connected between ratchet member 30 and member 10 by means of respective pins 62 and 64 to urge the ratchet into engagement with the handle. A further alternative embodiment of the tool is illustrated in FIG. 4, wherein the ratchet mechanism 22 is maintained in engagement with member 10 by means of a coil spring 66 wound around the ratchet mounting pin 34, with one end of spring 66 in engagement with member 12 and the other end in engagement with member 30.

From the foregoing, it is evident that a simple and extremely effective tool has been provided for the removal of a brake cable assembly from an automotive vehicle in a safe and efficient manner. Although particular embodiments of the invention have been shown and described, various modifications and alternative implementations will occur to those versed in the art. For example, resilient sleeves 70 (FIG. 2) can be provided for comfortable tool handling, and details of construction can be varied to suit particular operating needs. Accordingly, it is not intended to limit the invention by what has been particularly shown and described, except as indicated in the appended claims.

What is claimed is:
1. A brake cable release tool comprising:
 first and second jaws pivotally interconnected and configured to be inserted into a brake cable assembly;
 first and second handles connected to said respective first and second jaws and manually operable to open said jaws into predetermined spaced apart relationship;
 a lever mechanism pivotally connected to the end of one of said jaws and operative to remove a brake cable from said jaws;
 a ratchet mechanism connected to said jaws and operative to maintain said jaws in predetermined spaced-apart relationship;
 first spring means urging said ratchet mechanism into engagement to maintain said jaws in predetermined spaced-apart relationship; and
 second spring means operative to maintain said jaws in a closed position in the absence of force applied to said handles and upon release of said ratchet mechanism.

2. A brake cable release tool according to claim 1 wherein said jaws are of generally rectangular configuration dimensioned to fit within a brake cable assembly, said jaws each having a slot therein for engaging said brake cable.

3. A brake cable release tool according to claim 2 wherein said ratchet mechanism includes a member passing through an opening in one of said handles and pivotally attached to the other of said handles, said member having ratchet teeth formed on one edge thereof, spring means operative to urge said teeth into engagement with a portion of said opening, and an operating pad formed on the end thereof opposite the pivotal attachment.

4. A brake cable release tool according to claim 2 wherein said lever mechanism includes a generally L-shaped member pivotally connected at the junction of the arms of said member to one of said jaws having a slot formed therein, one arm of said member being normally disposed adjacent the bottom of said slot and being movable across said slot substantially in the plane thereof, the other of said arms being disposed toward said handles and having an opening pad formed on the distal end thereof.

5. A brake cable release tool according to claim 2 wherein said lever mechanism includes a generally Y-shaped member having a pair of bifurcated arms pivotally attached to one of said jaws having a slot formed therein, said bifurcated arms having a slot therebetween substantially conforming with the slot in said jaw, said Y-shaped member being rotatable in the surface of movement of said jaws.

6. A brake cable release tool according to claim 3 wherein said first and second jaws and said first and second handles are formed of a pair of unitary members each having a central portion pivotally attached to the other, said ratchet mechanism being disposed in said central portion.

References Cited

UNITED STATES PATENTS 2,595,989   5/1952   Smeltz _____ 81—322
3,357,085  12/1967   Martin _____ 29—239

ROBERT C. RIORDON, Primary Examiner

G. F. GRAFEL, Assistant Examiner

U.S. Cl. X.R.
81—302